(12) United States Patent
Cockerell et al.

(10) Patent No.: US 8,363,541 B2
(45) Date of Patent: Jan. 29, 2013

(54) SERIAL DIGITAL COMMUNICATION PROTOCOL

(75) Inventors: Geoffrey Cockerell, Apple Hill (CA); Bill Mark, Laval (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 579 days.

(21) Appl. No.: 11/615,240

(22) Filed: Dec. 22, 2006

(65) Prior Publication Data

US 2008/0151883 A1    Jun. 26, 2008

(51) Int. Cl.
 G06F 11/00    (2006.01)
 G06F 11/07    (2006.01)
 H04L 1/00     (2006.01)

(52) U.S. Cl. .................... 370/216; 370/242; 370/546

(58) Field of Classification Search ............... 370/216, 370/242, 392, 546
See application file for complete search history.

(56) References Cited

U.S. PATENT DOCUMENTS

| | | | |
|---|---|---|---|
| 5,553,302 A | 9/1996 | Morrissey et al. | |
| 5,668,803 A | 9/1997 | Tymes et al. | |
| 5,898,712 A | 4/1999 | Kodama et al. | |
| 6,243,733 B1 * | 6/2001 | Page et al. | 708/523 |
| 6,269,099 B1 * | 7/2001 | Borella et al. | 370/389 |
| 6,310,884 B1 * | 10/2001 | Odenwald, Jr. | 370/412 |
| 6,609,167 B1 | 8/2003 | Bastiani et al. | |
| 6,836,869 B1 * | 12/2004 | Wyland | 714/781 |
| 6,909,717 B1 * | 6/2005 | Higgins | 370/394 |
| 6,944,163 B2 * | 9/2005 | Bottorff et al. | 370/395.5 |
| 2003/0053486 A1 * | 3/2003 | Okamori | 370/474 |
| 2004/0073788 A1 * | 4/2004 | Kim et al. | 713/160 |
| 2005/0010925 A1 * | 1/2005 | Khawand et al. | 719/310 |
| 2005/0204027 A1 * | 9/2005 | Claseman | 709/223 |
| 2005/0237434 A1 * | 10/2005 | Takatori et al. | 348/725 |
| 2006/0221953 A1 * | 10/2006 | Basso et al. | 370/389 |

FOREIGN PATENT DOCUMENTS

CA    2142903    1/1995

OTHER PUBLICATIONS

International Search Report Form PCT/ISA/210 pp. 1-4.
Canadian Intellectual Property Office; Examiners Requisition dated Feb. 23, 2012.

* cited by examiner

*Primary Examiner* — Dang Ton
*Assistant Examiner* — Robert M Morlan
(74) *Attorney, Agent, or Firm* — Norton Rose Canada LLP

(57) ABSTRACT

Provided is a method and an apparatus for formatting a data set for transmission on a communication channel. The formatted data frame comprises a header and the data set to be transmitted. The header has a plurality of header fields comprising a redundancy field having a checksum calculated on data in part of the header fields and on the data set.

26 Claims, 4 Drawing Sheets

SERIAL DIGITAL COMMUNICATION PROTOCOL

TECHNICAL FIELD

The invention relates generally to serial digital communication and, more particularly, to improved communication formats.

BACKGROUND OF THE ART

In aircraft applications, an Electronic Engine Control (EEC) provides monitoring and maintenance data transmitted to onboard Health Usage Monitoring Systems (HUMS) or Data Transmission Units (DTU) and transmitted to the Ground Support Equipment (GSE) on landing. Data stored during the flight is transmitted to the GSE using the airframe GSE connector, for maintenance purposes. The type of engine data to be transmitted may vary. However, if the data varies, the communication protocol may have to be altered to accommodate the variance.

Accordingly, there is a need to provide an improved serial digital communication protocol.

SUMMARY

In one aspect, provided is a method for formatting a data set for transmission on a communication channel, the method comprising: buffering the data set to be transmitted; providing a header having a plurality of header fields comprising a redundancy field having a cyclic redundancy checksum calculated on data in part of the header fields and on the data set; and combining the header and the data set to provide a formatted data frame to be transmitted on the communication channel.

In another aspect, provided is a digital data communication transmitter for transmitting a data set, the transmitter comprising: a memory for buffering the data set; a processing unit for providing a header having a plurality of header fields comprising a redundancy field comprising a cyclic redundancy checksum calculated on data in part of the header fields and on the data set, and for combining the header and the data set to provide a formatted data frame; and a signal generator for transmitting the formatted data frame.

In yet another aspect, provided is an apparatus for formatting a data set for transmission over a communication channel, the apparatus having a memory for buffering the data set; and a processing unit for formatting the data set and providing a formatted data frame, the formatted data frame comprising: a header having a plurality of header fields comprising a redundancy field with a cyclic redundancy checksum calculated on data in part of the header fields and on the data set; and the data set.

In still another aspect, provided is an apparatus for retrieving a data set from a formatted data frame to be used in a communication channel, the apparatus having a memory for buffering the data set; and a processing unit for retrieving the data set from the formatted data frame, the formatted data frame comprising: a header having a plurality of header fields comprising a redundancy field with a cyclic redundancy checksum calculated on data in part of the header fields and on the data set; and the data set.

Further details of these and other aspects of the present invention will be apparent from the detailed description and figures included below.

BRIEF DESCRIPTION OF THE DRAWINGS

Reference is now made to the accompanying figures, in which.

DETAILED DESCRIPTION

Figure 1:
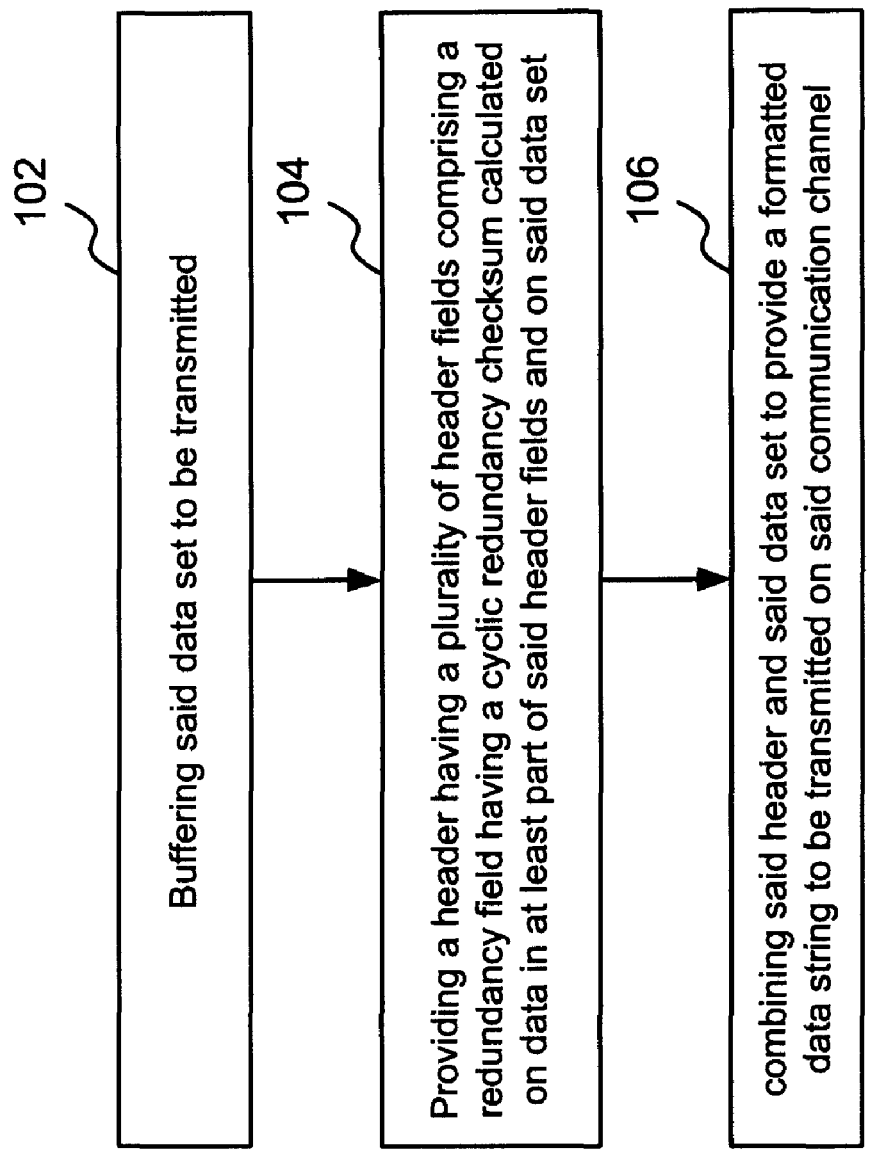
FIG. 1 is a flowchart which illustrates a method for formatting a data set for transmission on a communication channel.

A method for formatting a data set for transmission on a communication channel, is illustrated in FIG. 1. In step 102, the data set to be transmitted is buffered. In step 104, a header is provided. The header has a plurality of header fields comprising a redundancy field. The redundancy field contains a cyclic redundancy checksum calculated on the data set and on data in at least part of the header fields, excluding the redundancy field. The cyclic redundancy checksum may be based on the International Telecommunications Union ITU-TSS CRC-32 standard using a polynomial of 04C11DB7 hexadecimal, or may be calculated using any other cyclic redundancy checksum method known in the art. It is to be noted that any CRC algorithm—or even simple checksum routine—can be used. The one described above could be seeded with a different polynomial, the size of the CRC could be varied (need not be 4 bytes), etc. A CRC algorithm is a simple checksum. One of the CRC's characteristic is of being able to permit corrupted data to be rebuilt, depending on the extent of corruption and the size of the CRC. In step 106, the header and the data set are combined to provide a formatted data frame to be transmitted on the communication channel. This method provides a communication format including a redundancy checksum for error detection and allowing transmission of a data set of variable length. The data set may comprise a variable number of data entries all having the same variable size. In the latter case, the header should comprise a number field for indicating the number of data entries and a size field for indicating the size of each data entry. This allows evolution of the format over time by adding new functionalities or communicating new types of data entries. The formatted data frame may be transmitted using an RS-422 UART communication protocol or any appropriate communication protocol as known by one skilled in the art.

Figure 2:
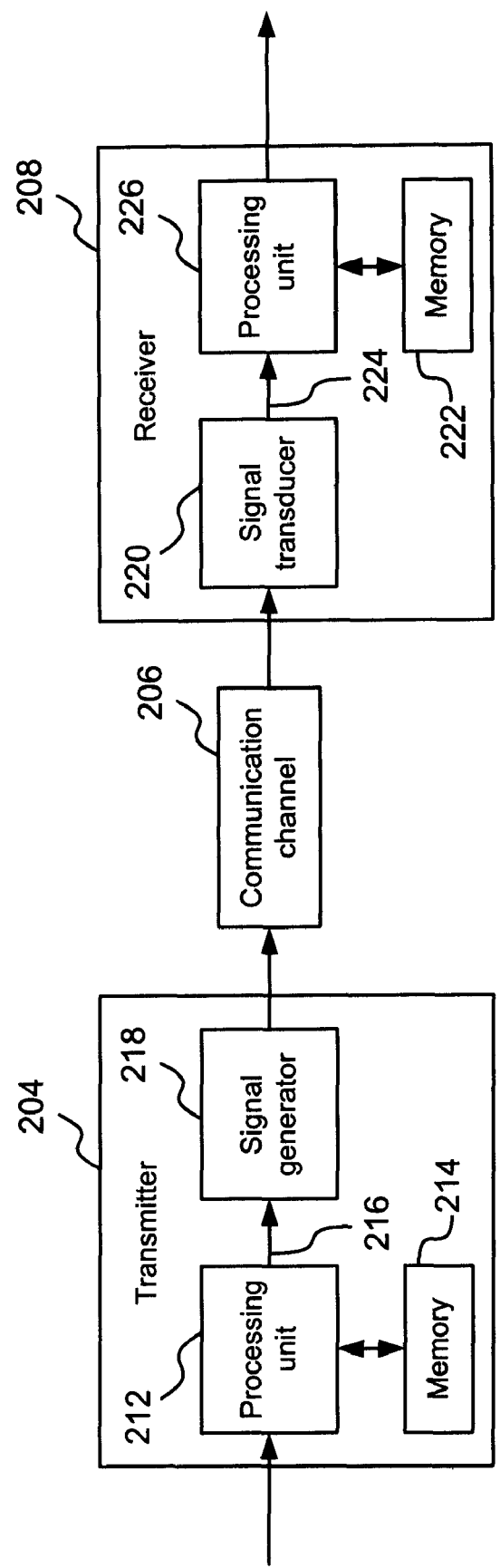
FIG. 2 is a block diagram which shows a digital communication system for transmitting a data set over a communication channel.

FIG. 2 shows a digital communication system for transmitting a data set over a communication channel 206, according to one embodiment. The digital communication system comprises a transmitter 204 and a receiver 208. The transmitter 204 has a memory 214 for buffering the data set to be transmitted, a processing unit 212 to provide a formatted data frame 216 and a signal generator 218 for generating a signal including the formatted data frame 216 for transmission over the communication channel 206. The processing unit 212 provides a header comprising a cyclic redundancy checksum calculated as previously described and combines the header and the data set to provide the formatted data frame 216. The receiver 208 has a signal transducer 220 for converting the received signal to a received formatted data frame 224, a processing unit 212 to retrieve the received data set and a memory 222 for buffering the received data set. The processing unit 212 may check for the presence of an error on the received data set using the cyclic redundancy checksum included in the received formatted data frame 224.

Figure 3:
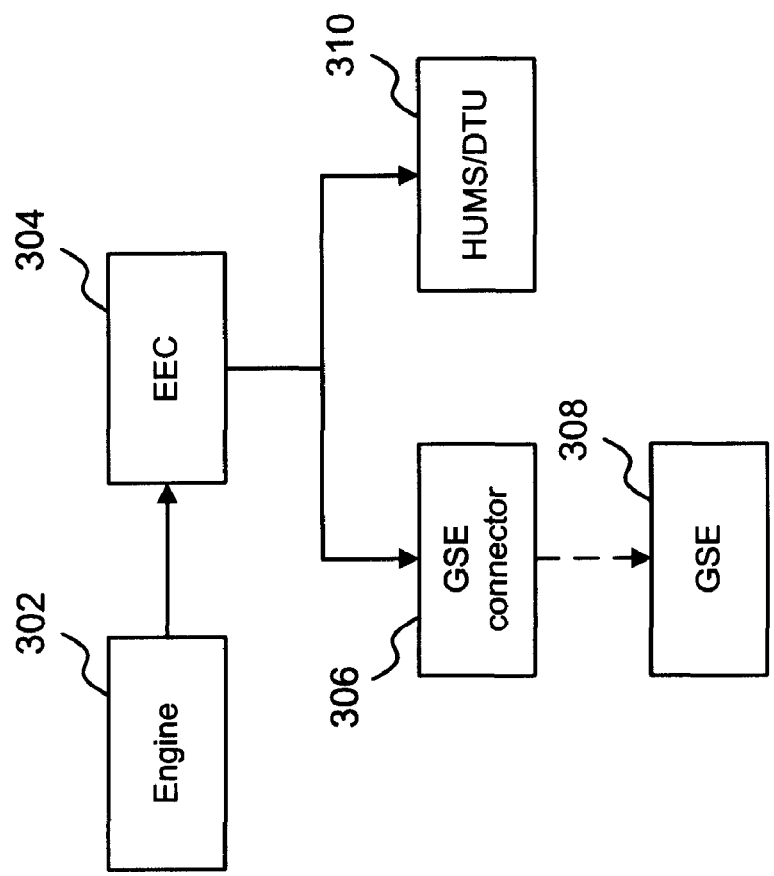
FIG. 3 is a block diagram which illustrates one specific application of a digital communication system, wherein the transmitter is an Electronic Engine Control.

FIG. 3 illustrates one specific application of a digital communication system. The Electronic Engine Control 304

(EEC) provides data from engine 302, such as for monitoring and maintenance purposes. This data is transmitted to the Ground Support Equipment (GSE) 308 via a GSE connector 306, and to any Health Usage Monitoring System or Digital Transmission Unit (HUMS/DTU) 310 using the transmission format previously described. In this embodiment, the EEC 304 comprises a transmitter, such as transmitter 204 from FIG. 2, and each of the GSE connector 306 and the HUMS/DTU 310 comprises a receiver, such as receiver 208 from FIG. 2, to communicate engine data.

This specific application described herein is not intended to be the exclusive embodiment of the present concept. The communication format may be applied to any suitable application where serial digital communication is required.

Figure 4:
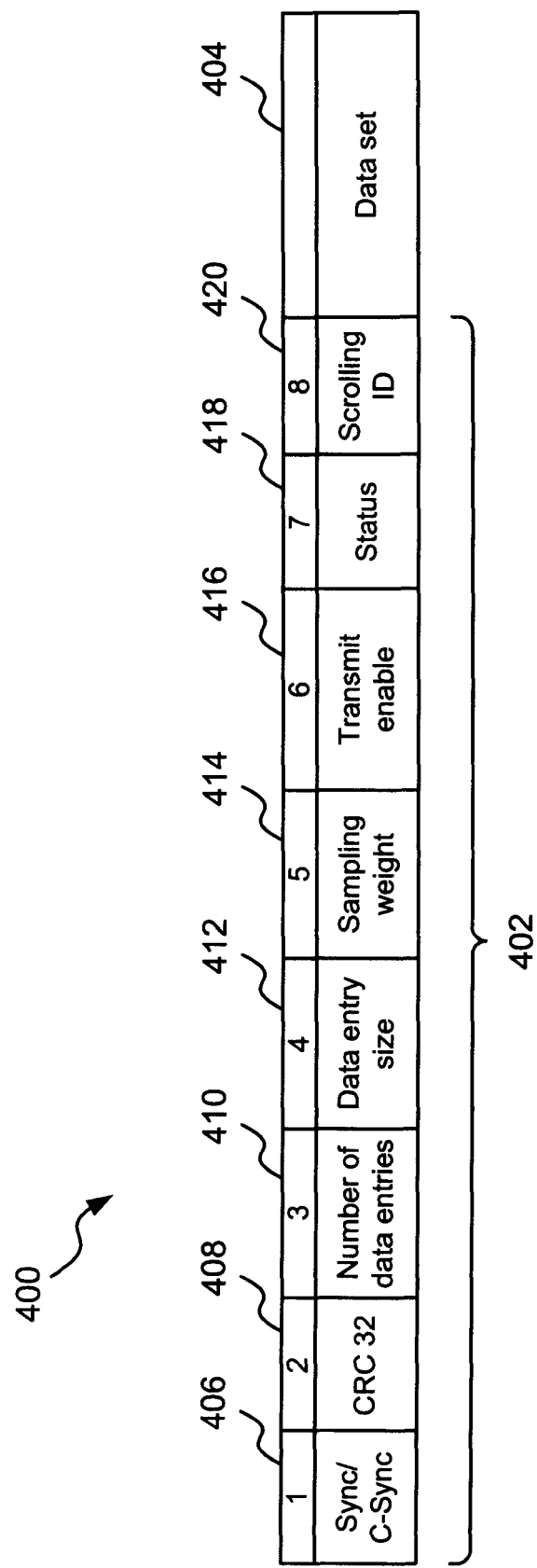
FIG. 4 is a schematic diagram which illustrates an example of a formatted data frame.

FIG. 4 illustrates an example of a formatted data frame 400. The formatted data frame 400 is adapted for communication of engine data by an Electronic Engine Control as described hereinabove. According to one communication format, the formatted data frame 400 consists of two data groups, the first group being a header 402 comprising a plurality of header fields 406, 408, 410, 412, 414, 416, 418, 420 and the second group being engine data collected by the Electronic Engine Control and grouped in a data set 404.

In this embodiment, the header 402 consists of eight header fields 406, 408, 410, 412, 414, 416, 418, 420. A first field 406 is an 1-byte alternating synchronization/counter synchronization pattern. It is used by external software tools to synchronize to the data stream and to distinguish one data frame from the next.

A second field, the redundancy field 408, is a 32-bit (4-byte) cyclic redundancy checksum (CRC) that is based on a standard specified by the International Telecommunications Union (ITU), ITU-TSS CRC32 and using a polynomial of 04CI 1DB7 hexadecimal. The CRC is calculated based on the remaining six header fields 410, 412, 414, 416, 418, 420 and the data set 404 before the entire formatted data frame is output by the transmitter. It provides a reliable method by which data corruption can be detected. This provision makes it possible to record and transport the data by wireless technology, aircraft telemetry, or by such means as FTP file transfer and still be able to verify the integrity of the data at any time. It may be useful in legal proceedings should the data integrity come under scrutiny.

A third field 410 is an 8-bit value indicating the number of data entries in the data set 404 and a fourth field 412 is a 4-bit value indicating the size of each of the data entries to be transmitted using the formatted data frame 400. For example, the size of the data entries can be specified according to Table 1. These fields, coupled with the first field 406 (synch/counter synch field), allow for the synch/counter synch bit pattern to be present in the engine data, a situation that is otherwise impossible for a receiver to synchronize to the beginning of a data frame. Once a synch/counter synch pattern is detected by the receiver, it can use the information contained in the third field 410 and fourth field 412 to project where the counter synch should be located. If it is unsuccessful in its first attempt to locate the counter synch, it scans linearly through the buffered data until it locates the next instance of the synch pattern. It repeats this cycle until it is successful and synchronizes onto the beginning of the data frame. It can then translate the information using an appropriate translation file. These fields are also used in varying the engine data entry size and the number of such data entry in a data set 404 to vary, providing flexibility from engine application to engine application while allowing the receiver to maintain a constant approach to achieving synchronization.

TABLE 1

Size definitions

| Type Value | Individual Data Size |
|---|---|
| 0 | Byte |
| 1 | Word (16-bits) |
| 2 | DCU Block (132 bytes) |
| 3 | Dword (32-bits) |
| 4 | EEC EEPROM (132 bytes) |
| 5-15 | Spare |

A fifth field 414 and a sixth field 416 are provisions for such devices as Health Usage Monitoring Systems (HUMS) or Data Transmission Units (DTU). They provide general information for such devices that allows them to determine when to record information and to allocate a level of importance to the recorded data for resolution purposes. It provides general information to provision for such devices where the device vendor could configure their HUMS or DTU according to the device capabilities or limitations. The fifth field 414 is a 4-bit value that is used to weight real time display data for the HUMS/DTU or the GBS data frame capture or sampling rate as defined in Table 2.

TABLE 2

Real time display data frame sampling rate

| Sampling Weight Code | Definition |
|---|---|
| 0 | Fast (Fault or Surge) |
| 1 | Medium (Event or Exceedance) |
| 2 | Slow (Trend Monitoring) |
| 3-15 | Spare |

The sixth field 416 is a 1-bit value that is used by the Electronic Engine Control in conjunction with a DTU signal to specify to the DTU that it may enable its transmitter.

A seventh field 418 is a 7-bit value providing information as to the type of engine data being transmitted. This field informs the receiver as to which translation file to access so as to be able to decrypt engine data in the data set 404.

An eighth field 420 is an 8-bit string dedicated to a series of scrolling ASCII character strings. Each successive formatted data frame contains one of such ASCII character. Since the data frames are received sequentially, the individual characters can be assembled into strings of information. The software identifier of the EEC and the serial number of the engine to which the EEC is coupled can be included. The aircraft identification number is a possible character string. The EEC software identifier character string allows for the receiver to automatically configure itself to access the correct set of translation files to interpret the engine data in the data set 404. The seventh field 418 is used to select the correct translation file from the complete set of such translation files for a given EEC software version. The engine serial number ensures that the data is allocated to the correct turbo machine.

The checksum of the present approach does not require the remainder of the data communication to have a fixed length. This allows the engine control system to "grow" over time—for example, new functionality can be added, new information communicated in the protocol, just by adding the appropriate new header elements—the protocol is not static, or fixed in time, but permits the communicated data to be reprogrammed and thereby evolve without having to modify the basic elements of the protocol.

The above description is meant to be exemplary only, and one skilled in the art will recognize that changes may be made to the embodiments described without departing from the scope of the invention disclosed. For example, the fifth, the sixth or the seventh field could be omitted or replace by other header field if the described communication format is to be used for applications other than an aircraft engine monitoring application. Additional header elements may be added. Also, the illustrated embodiment uses a 32-bit cyclic redundancy checksum, but a 16-bit or 64-bit cyclic redundancy checksum could be used instead. Other suitable types of checksum arrangements of data integrity mechanisms may be used instead of, or in conjunction with, a cyclic redundancy checksum. Still other modifications which fall within the scope of the present invention will be apparent to those skilled in the art, in light of a review of this disclosure, and such modifications are intended to fall within the appended claims.

What is claimed is:

1. A system for retrieving a data set from a formatted data frame in a data stream received from an electronic engine control for a gas turbine engine, the system comprising:
   memory for buffering the data stream; and
   a processing unit configured to retrieve a data set comprising engine data relating to the gas turbine engine from a first formatted data frame in the data stream, by:
   a) identifying a candidate first synch/counter synch field in a candidate header of the first formatted data frame, the synch/counter synch field representing one of a synchronization pattern and a counter synchronization pattern;
   b) determining a number of data entries in the data set based on a candidate number field in the candidate header;
   c) determining a size of each data entry in the data set, based on a candidate size field in the candidate header;
   d) calculating an expected location of a next synch/counter synch field of a next formatted data frame in the data stream, based on the number of data entries and the size of each data entry determined from the candidate header;
   e) determining whether another one of the synchronization pattern and the counter synchronization pattern, alternating with the candidate first synch/counter synch field, is located at the calculated location;
      if the other one of the synchronization pattern and the counter synchronization pattern is found located at the expected location, determining the candidate header as the verified header of the first formatted data frame;
      if the other one of the synchronization pattern and the counter synchronization pattern is not found at the calculated location, discarding the candidate first synch/counter synch field, scanning linearly through the data stream for a next candidate first synch/counter synch field and repeating a) to e); and
   f) retrieving the data set from the first formatted data frame using information in the verified header of the first formatted data frame.

2. The system of claim 1, wherein the candidate first synch/counter synch field comprises one byte.

3. The system of claim 1, wherein the processing unit is further configured to retrieve from the verified header a scrolling character field where two or more scrolling character fields from successive formatted data frames form an information string.

4. The system of claim 3, wherein the information string comprises a software identifier.

5. The system of claim 3, wherein the information string comprises an engine serial number.

6. The system of claim 1, wherein the processing unit is further configured to retrieve from the verified header a redundancy field having a checksum calculated based on the data set and on at least part of the verified header.

7. The system of claim 6, wherein the checksum comprises a cyclic redundancy checksum.

8. The system of claim 1, wherein the data set has a variable length.

9. The system of claim 1, wherein the data set comprises a variable number of data entries all having the same variable size.

10. The system of claim 1, wherein the processing unit is further configured to retrieve from the verified header a status field providing information as to a type of engine data contained in the first formatted data frame.

11. The system of claim 10, wherein the processing unit is further configured to access a translation file to decrypt the first formatted data frame based on the status field.

12. The system of claim 1, wherein the data stream is received using an RS-422 UART communication protocol.

13. The system of claim 1, wherein the memory and the processing unit are part of ground support equipment.

14. A method for retrieving a data set from a formatted data frame in a data stream received from an electronic engine control for a gas turbine engine, the method comprising:
   a) identifying a candidate first synch/counter synch field in a candidate header of the first formatted data frame, the synch/counter synch field representing one of a synchronization pattern and a counter synchronization pattern;
   b) determining a number of data entries in the data set based on a candidate number field in the candidate header;
   c) determining a size of each data entry in the data set, based on a candidate size field in the candidate header;
   d) calculating an expected location of a next synch/counter synch field of a next formatted data frame in the data stream, based on the number of data entries and the size of each data entry determined from the candidate header;
   e) determining whether another one of the synchronization pattern and the counter synchronization pattern, alternating with the candidate first synch/counter synch field, is located at the calculated location;
      if the other one of the synchronization pattern and the counter synchronization pattern is found located at the expected location, determining the candidate header as the verified header of the first formatted data frame;
      if the other one of the synchronization pattern and the counter synchronization pattern is not found at the calculated location, discarding the candidate first synch/counter synch field, scanning linearly through the data stream for a next candidate first synch/counter synch field and repeating a) to e); and
   f) retrieving the data set comprising engine data relating to the gas turbine engine from the first formatted data frame using information in the verified header of the first formatted data frame.

15. The method of claim 14, wherein the candidate first synch/counter synch field comprises one byte.

16. The method of claim 14, further comprising retrieving from the verified header a scrolling character field where two or more scrolling character fields from successive formatted data frames form an information string.

17. The method of claim 16, wherein the information string comprises a software identifier.

18. The method of claim 16, wherein the information string comprises an engine serial number.

19. The method of claim 14, further comprising retrieving from the verified header a redundancy field having a checksum calculated based on the data set and on at least part of the verified header.

20. The method of claim 19, wherein the checksum comprises a cyclic redundancy checksum.

21. The method of claim 14, wherein the data set has a variable length.

22. The method of claim 14, wherein the data set comprises a variable number of data entries all having the same variable size.

23. The method of claim 14, further comprising retrieving from the verified header a status field providing information as to a type of engine data contained in the first formatted data frame.

24. The method of claim 23, wherein the processing unit is further configured to access a translation file to decrypt the first formatted data frame based on the status field.

25. The method of claim 14, wherein the data stream is received using an RS-422 UART communication protocol.

26. The method of claim 14, wherein the data stream is received at ground support equipment.

* * * * *